(12) United States Patent  (10) Patent No.: US 9,126,145 B2
Maltby et al.  (45) Date of Patent: Sep. 8, 2015

(54) PHOTOCATALYTIC COATING

(71) Applicant: CRISTAL USA INC., Hunt Valley, MD (US)

(72) Inventors: Julie Elizabeth Maltby, North Lincolnshire (GB); Claire Bygott, North East Lincolnshire (GB)

(73) Assignee: Cristal USA, Inc., Hunt Valley, MD (US)

( * ) Notice: Subject to any disclaimer, the term of this patent is extended or adjusted under 35 U.S.C. 154(b) by 0 days.

(21) Appl. No.: 14/324,730

(22) Filed: Jul. 7, 2014

(65) Prior Publication Data

US 2014/0322116 A1   Oct. 30, 2014

Related U.S. Application Data

(62) Division of application No. 11/848,972, filed on Aug. 31, 2007.

(51) Int. Cl.
*B01D 53/56* (2006.01)
*C08F 20/06* (2006.01)
(Continued)

(52) U.S. Cl.
CPC ........... *B01D 53/8628* (2013.01); *B01J 21/063* (2013.01); *B01J 35/004* (2013.01);
(Continued)

(58) Field of Classification Search
CPC ...... B01J 21/63; B01J 37/0219; B01J 35/004; B01D 53/8628; B82Y 30/00; C04B 26/06; C04B 41/5041; C04B 14/305; C04B 41/483; C04B 41/4876; C04B 2111/2061; C04B 2103/54; C09D 1/00; C09D 5/00; C09D 7/1216; C09D 7/1266; C08K 3/22; C08K 3/26
USPC ...................... 423/239.1; 526/319, 317.1, 346
See application file for complete search history.

(56) References Cited

U.S. PATENT DOCUMENTS 3,767,455 A  10/1973  Claridge et al.
4,012,338 A  3/1977  Urwin
(Continued)

FOREIGN PATENT DOCUMENTS

DE  19858933 A1  6/2000
EP  0590477 A1  6/1994
(Continued)

OTHER PUBLICATIONS

Ke, Yuzhang et al., "Preparation of Titania coating on ceramic surface for anti-fouling, deodorization, and serilization," (2001) abstract.
(Continued)

*Primary Examiner* — William Cheung
(74) *Attorney, Agent, or Firm* — Greenberg Traurig; Jonathan D. Ball

(57) ABSTRACT

De-polluting, self-cleaning coating compositions are disclosed which comprise an organic binder having dispersed therein photocatalytic titanium dioxide particles substantially in anatase form which have an average crystallite size between about 1 nm and about 150 nm and which preferably have photocatalytic activity in the presence of visible light. Advantageously, the coatings of the invention do not require pre-activation to achieve high initial photocatalytic activity against pollutants in the air, such as $NO_x$ compounds.

3 Claims, 2 Drawing Sheets

$NO_x$ removal (%) under different low level lighting conditions (without prior activation of photocatalyst)

(51) Int. Cl.

| | | |
|---|---|---|
| *C08F 118/02* | (2006.01) | |
| *C08F 12/02* | (2006.01) | |
| *B01D 53/86* | (2006.01) | |
| *B01J 21/06* | (2006.01) | |
| *B01J 35/00* | (2006.01) | |
| *B01J 37/02* | (2006.01) | |
| *B82Y 30/00* | (2011.01) | |
| *C04B 26/06* | (2006.01) | |
| *C04B 41/50* | (2006.01) | |
| *C09D 1/00* | (2006.01) | |
| *C09D 5/00* | (2006.01) | |
| *C09D 7/12* | (2006.01) | |
| *C04B 111/20* | (2006.01) | |
| *C08K 3/22* | (2006.01) | |
| *C08K 3/26* | (2006.01) | |

(52) U.S. Cl.
CPC ............ *B01J37/0219* (2013.01); *B82Y 30/00* (2013.01); *C04B 26/06* (2013.01); *C04B 41/5041* (2013.01); *C09D 1/00* (2013.01); *C09D 5/00* (2013.01); *C09D 7/1216* (2013.01); *C09D 7/1266* (2013.01); *C04B 2111/2061* (2013.01); *C08K 3/22* (2013.01); *C08K 3/26* (2013.01); *Y10T 428/31855* (2015.04)

(56) References Cited

U.S. PATENT DOCUMENTS

| | | | |
|---|---|---|---|
| 4,052,223 A | 10/1977 | Howard | |
| 4,420,437 A | 12/1983 | Epstein et al. | |
| 5,541,252 A | 7/1996 | Schmitt et al. | |
| 5,547,823 A | 8/1996 | Murasawa et al. | |
| 5,562,764 A | 10/1996 | Gonzalez | |
| 5,658,841 A | 8/1997 | Tanaka et al. | |
| 6,001,326 A | 12/1999 | Kim et al. | |
| 6,103,363 A | 8/2000 | Boire et al. | |
| 6,228,480 B1 | 5/2001 | Kimura et al. | |
| 6,342,099 B1 | 1/2002 | Hiew et al. | |
| 6,387,844 B1 | 5/2002 | Fujishima et al. | |
| 6,566,472 B1 | 5/2003 | Baumstark et al. | |
| 6,627,366 B2 | 9/2003 | Yang | |
| 6,673,433 B1 | 1/2004 | Saeki et al. | |
| 6,695,906 B2 | 2/2004 | Hiew et al. | |
| 6,824,826 B1 | 11/2004 | Amadelli et al. | |
| 6,852,306 B2 | 2/2005 | Subramanian et al. | |
| 7,153,808 B2 | 12/2006 | Iwamoto et al. | |
| 7,686,879 B2 | 3/2010 | Grochal et al. | |
| 7,776,954 B2 | 8/2010 | Stratton et al. | |
| 7,795,173 B2 | 9/2010 | Vanderspurt et al. | |
| 8,283,277 B2 | 10/2012 | Seeber et al. | |
| 2003/0082367 A1 | 5/2003 | Talpaert et al. | |
| 2003/0087208 A1 | 5/2003 | Bourdelais et al. | |
| 2003/0143437 A1 | 7/2003 | Ohtsu et al. | |
| 2003/0166765 A1 | 9/2003 | Sugihara | |
| 2004/0092393 A1 | 5/2004 | Bygott et al. | |
| 2004/0197254 A1 | 10/2004 | Toki et al. | |
| 2004/0241502 A1 | 12/2004 | Chung et al. | |
| 2005/0065222 A1 | 3/2005 | Brady et al. | |
| 2005/0233146 A1 | 10/2005 | Nonninger | |
| 2005/0271578 A1 | 12/2005 | Terada et al. | |
| 2006/0110314 A1 | 5/2006 | Torardi | |
| 2007/0154378 A1 | 7/2007 | Aso et al. | |
| 2007/0155622 A1 | 7/2007 | Goodwin et al. | |
| 2007/0167551 A1* | 7/2007 | Goodwin et al. | 524/442 |
| 2008/0003367 A1 | 1/2008 | Stratton | |
| 2008/0097018 A1 | 4/2008 | Stratton | |
| 2009/0281207 A1 | 11/2009 | Stratton et al. | |

FOREIGN PATENT DOCUMENTS

| | | |
|---|---|---|
| EP | 901991 A2 | 3/1999 |
| EP | 923988 A1 | 6/1999 |
| EP | 1074525 A1 | 7/2001 |
| EP | 1118385 A1 | 7/2001 |
| FR | 2776944 A1 | 10/1999 |
| FR | 2838735 A1 | 10/2003 |
| JP | 10180118 | 7/1998 |
| JP | 10212809 | 8/1998 |
| JP | 10230169 A | 9/1998 |
| JP | 10289605 | 10/1998 |
| JP | 11349328 | 12/1999 |
| JP | 2000271441 A | 10/2000 |
| JP | 2000271491 A | 10/2000 |
| JP | 2000290534 A | 10/2000 |
| JP | 2002060686 A | 2/2002 |
| JP | 2004217897 A | 8/2004 |
| JP | 2005097096 A | 4/2005 |
| JP | 2006021112 A | 1/2006 |
| JP | 2010537033 A | 12/2010 |
| WO | 9707069 A1 | 2/1997 |
| WO | 9710186 A1 | 3/1997 |
| WO | 9841480 A1 | 9/1998 |
| WO | 0240609 A1 | 5/2002 |
| WO | 2004063431 A1 | 7/2004 |
| WO | 2005082810 A1 | 9/2005 |
| WO | 2005083013 A1 | 9/2005 |
| WO | 2005083014 A1 | 9/2005 |
| WO | 2005118726 A1 | 12/2005 |
| WO | 2006030250 A2 | 3/2006 |
| WO | 2008048765 A2 | 4/2008 |

OTHER PUBLICATIONS

Mowrer, Norman R.; Polysiloxanes; Ameron International; Performance Coatings and Finishes (Nov. 2003).

PICADA Official Presentation, (Feb. 2006).

Yu et al., J. Chem. Ed., (1998), vol. 75, No. 6, pp. 750-751.

* cited by examiner

PHOTOCATALYTIC COATING

This application is a divisional under 35 U.S.C §120 of U.S. patent application Ser. No. 11/848,972, filed Aug. 31, 2007, the contents of which are hereby incorporated by reference in their entirety.

FIELD OF INVENTION

The present invention relates to compositions for imparting a photocatalytic coating on a surface. More specifically, the invention relates to de-polluting, self-cleaning paints comprising titanium dioxide particles which do not require prior activation to achieve high initial photocatalytic activity.

BACKGROUND OF THE INVENTION

The photocatalytic properties of the semiconductor material titanium dioxide result from the promotion of electrons from the valence band to the conduction band under the influence of ultraviolet (UV) and near-UV radiation. The reactive electron-hole pairs that are created migrate to the surface of the titanium dioxide particles where the holes oxidize adsorbed water to produce reactive hydroxyl radicals and the electrons reduce adsorbed oxygen to produce superoxide radicals, both of which can degrade $NO_x$ and volatile organic compounds (VOCs) in the air. In view of these properties, photocatalytic titanium dioxide has been employed in coatings and the like to remove pollutants from the air. Such coatings may also have the advantage of being self-cleaning since soil (grease, mildew, mold, algae, etc.) is also oxidized on the surface.

Despite the benefits of existing photocatalytic titanium dioxide coatings, there is room for improvement in the art. Particularly, it has been observed that the initial activity of conventional photocatalytic titanium dioxide coatings is poor unless the coating has been pre-activated, such as by washing with water. While not wishing to be bound by any theory, it is believed that the activation step is required to remove organic constituents present in the coating composition from the surface of the catalyst or possibly to provide a hydrated surface on the titanium dioxide particles from which reactive radical species are formed. However, this additional step makes application of a photocatalytic titanium dioxide coating somewhat inconvenient because it is time consuming and adds additional costs to the application process. It would be desirable to provide a photocatalytic titanium dioxide coating, particularly in the form of a paint, which does not require pre-activation (e.g., a washing step or exposure to elements) to achieve high initial activity levels.

It has also been difficult to provide coatings having high levels of photocatalyst because the catalyst tends to oxidize and break down the polymeric binder of the coating. This problem is exacerbated when the coating is exposed to intense UV radiation from direct sunlight, as is the case with an exterior paint. Such coatings are often formulated with inorganic binders or with organic polymers which are resistant to photocatalytic oxidation at relatively low catalyst concentrations. However, in low light conditions the de-pollution properties of the coating are less than optimal. It would be desirable to provide a coating for use in low light environments (e.g., indoors) that incorporates high levels of photocatalyst for optimal de-pollution and which is resistant to degradation, yet provides high catalytic activity under indoor lighting conditions.

It is therefore an object of the present invention to provide coating compositions, particularly paint compositions, which comprise titanium dioxide photocatalysts capable of removing pollutants from the air, which photocatalysts have high initial activity without prior activation. It is a further object of the invention to provide durable coatings having high levels of photocatalytic titanium dioxide which coatings have de-pollution activity in low light environment, and in particular in the presence of visible light.

The foregoing discussion is presented solely to provide a better understanding of nature of the problems confronting the art and should not be construed in any way as an admission as to prior art nor should the citation of any reference herein be construed as an admission that such reference constitutes "prior art" to the instant application.

SUMMARY OF THE INVENTION

In accordance with the foregoing objectives and others, it has surprisingly been found that coatings comprising titanium dioxide of crystallite size in the range of about 1 nm (nanometers) to about 150 nm, more particularly about 5 nm to about 30 nm, and preferably about 5 to about 10 nm, do not require pre-activation (e.g., by washing with water) to achieve a high initial level of photocatalytic activity in the presence of light. The inventive coatings show substantial photocatalytic activity in the presence of visible light which makes them ideal for use as de-polluting coatings in low light environments, including the indoors.

In one aspect of the invention, the self-cleaning, de-polluting coating compositions are in the form of water-based paints which include (i) from about 5% to about 40% by volume photocatalytic titanium dioxide, preferably in substantially pure anatase form, the photocatalytic titanium dioxide being characterized by an average crystallite size between about 5 nm and about 30 nm and having photocatalytic activity in the presence of visible light; (ii) one or more additional pigments, such that the total pigment volume concentration ("PVC") of the paint, inclusive of said photocatalytic titanium dioxide, is at least about 65%; and (iii) a styrene acrylic copolymer binder; the paint being capable of substantially reducing $NO_x$ compounds in the absence of prior activation with water.

Another aspect of the invention provides substrates having deposited thereon a layer of the self-cleaning, de-polluting coating compositions according to the invention, and optionally further comprising an overcoat disposed on said paint layer comprising a second photocatalytic titanium dioxide having a crystallite sizes in the range of 5 nm to 30 nm, the overcoat being formed by applying a sol over the paint layer.

In another aspect of the invention, a method is provided for removing $NO_x$ or other pollutants from the air, comprising applying to a surface, such as a wall, floor, ceiling, or the like, a layer of de-polluting coating according to the invention, with or without prior activation by washing with an aqueous solvent, and preferably without a washing step, said coating being capable of substantially removing pollutants from the air in the presence of UV and/or visible light, preferably in the presence of visible light, and optionally applying a sol topcoat comprising photocatalytic titanium dioxide over said paint layer.

These and other aspects of the present invention will be better understood by reference to the following detailed description and accompanying figures.

DETAILED DESCRIPTION

Figure 1:
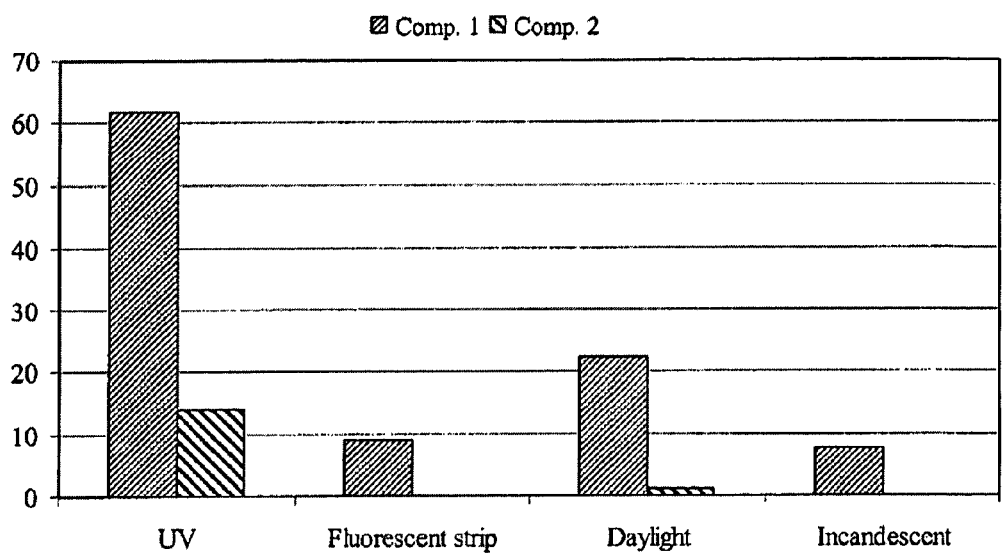
FIG. 1 compares the $NO_x$ activities of two photocatalytic titanium dioxide coatings which have not been pre-activated under various lighting conditions, where "Comp. 1" is a coating comprising photocatalytic titanium dioxide powder having an average crystallite size of about 5-10 nm and "Comp. 2" is a coating comprising photocatalytic titanium dioxide powder having an average crystallite size of about 15-25 nm.

All terms used herein are intended to have their ordinary meaning unless otherwise provided. All references to "% by weight" herein relate to the weight % of the total paint formulation, including solvent, rather than the dried paint, unless otherwise specified. Reference to "% by volume" or "pigment volume concentration" refers to the volume % of the dry paint or coating, unless otherwise specified. The term "$NO_x$" refers to the species NO (nitrogen oxide) and $NO_2$ (nitrogen dioxide), either collectively or individually.

In the broadest sense of the invention, the self-cleaning, de-polluting coating compositions comprise photocatalytic titanium dioxide particles, an organic binder, and optionally one or more additional pigments, such as calcium carbonate. The coatings may be in the form of paints (interior or exterior), in particular water-based paints, and ideally will have a high (e.g., greater than 60%) total pigment volume concentration ("PVC").

The coatings or paints are capable of substantially reducing $NO_x$ compounds in the absence of prior activation with water. It will be understood that while the coatings of the invention are capable of substantially reducing pollutants in the absence of prior activation with water, it is nevertheless within the scope of the invention to activate the coatings by treatment with water after application to further enhance the photocatalytic activity.

Where it is stated that a paint has substantial "initial" photocatalytic activity, in the absence of prior activation with water, it is meant that the paint has substantial measurable activity against $NO_x$ compounds immediately after a coating of the paint formed onto a substrate has fully dried and/or cured to the extent customarily permitted before such a paint is put into service (e.g., it is non-tacky and does not readily transfer on touching, etc.).

Where reference is made to "removal" of pollutants from the air, it will be understood to include complete or partial removal of pollutants from the air. Whether removal is "substantial" can be determined by the methods provided in the examples, where "substantial" removal refers to reduction in the total concentration of a fixed amount of given pollutant by at least about 2.5%, preferably at least about 5%, and more preferably at least about 7.5%.

The self-cleaning, depolluting paints of the invention comprise particles of photocatalytic titanium dioxide ($TiO_2$) which are capable of forming electron-hole pairs in the presence of electromagnetic radiation, particularly ultraviolet (UV), near-UV, and/or visible light. Preferably, the photocatalytic titanium dioxide is capable of substantial photoactivity in the presence of visible light. To this end, it has surprisingly been discovered that careful control over the crystalline form and particle size of the titanium dioxide provides photocatalyts which are capable of removing pollutants in low UV light environments, particularly indoor environments, and which have substantial initial activity, even in the absence of activation by washing with a solvent (e.g., water).

The photocatalytic titanium dioxide particles for use in the paint compositions is preferably predominantly in the anatase crystalline form because of its higher photoactivity than the rutile form. "Predominantly" means that the level of anatase in the titanium dioxide particles of the paint is greater than 50% by mass, although it is preferred that the level of anatase is greater than about 80%, and more preferably greater than about 90%. In some embodiments, the photocatalytic titanium dioxide particles of the paint will be in substantially pure anatase form, meaning that the content of the rutile crystalline form is less than about 5%, more particularly, less than about 2.5%, and more preferred still, less than about 1% by mass. In some embodiments, the photocatalytic titanium dioxide particles will be free of the rutile form, meaning that the rutile crystal form is not detectable by crystallography. Put another way, the photocatalytic titanium dioxide particles may comprise 100% anatase form. The degree of crystallization and the nature of the crystalline phase are measured by X-ray diffraction.

The photocatalytic titanium dioxide particles for use in the paint compositions will typically have an average particle size which enables the particles to predominately absorb, rather than scatter, light. As the particle sizes become very small, the band gap between the valence and conduction bands decreases. Thus, with sufficiently small particle sizes, it has been observed that titanium dioxide particles are capable of absorbing light in the visible spectrum. The titanium dioxide particles for inclusion in the inventive paints will typically have a particle size between about 1 nm and about 150 nm. More typically, the particle size will be between about 5 nm and about 20 nm, 25 nm, or about 30 nm. In a preferred embodiment, the particle size of the titanium dioxide in the paint will be between about 5 nm and about 15 nm, and more particularly between about 5 and about 10 nm. Reference herein to the size of titanium dioxide particles (or crystallites) will be understood to mean the average particle size of the titanium dioxide particulates. Where the particle size is modified by the term "about," it will be understood to embrace somewhat larger or smaller particles sizes than the indicated value to account for experimental errors inherent in the measurement and variability between different methodologies for measuring particle size, as will be apparent to one skilled in the art. The diameters may be measured by, for example, transmission electron microscopy (TEM) and also XRD.

Alternatively, the particles may be characterized by surface area. Typically, the powdered titanium dioxide photocatalyst will have a surface area, as measured by any suitable method, including 5-point BET, of greater than about 70 $m^2/g$, more typically, greater than about 100 $m^2/g$, and preferably greater than about 150 $m^2/g$. In some embodiments, the titanium dioxide photocatalyst will have a surface area greater than about 200 $m^2/g$, greater than about 250 $m^2/g$, or even greater than about 300 $m^2/g$.

The photocatalytic titanium dioxides available from Millennium Inorganic Chemicals under the designations PCS300 and PC500 have been found to be particularly useful for inclusion in the paints according to the invention. PCS300 is a 100% anatase titanium dioxide powder having an average crystallite size between about 5 nm and about 10 nm. PC500 is also a 100% anatase titanium dioxide powder, which has a $TiO_2$ content between about 82% and about 86% by weight, and which has a surface area of about 250 to about 300 $m^2/g$, as measured by 5-point BET, which translates to an average particle size of about 5 nm to about 10 nm. The product designated PC105, also from Millennium Inorganic Chemicals, will also find utility in some embodiments of the invention. This photocatalytic powder comprises greater than 95% by weight titanium dioxde, the $TiO_2$ being 100% anatase, and has an average crystallite size of about 15 nm to about 25 nm and a surface area between about 80 and about 100 $m^2/g$.

The photocatalytic titanium dioxide will typically comprise from about 2 to about 40% by volume of the paint formulation. More typically, the photocatalytic titanium dioxide will comprise from about 5% to about 20% by volume of the paint, and preferably from about 7.5% to about 15% by volume. In a representative embodiment, the photocatalytic titanium dioxide comprises about 10% by volume of the paint formulation. The foregoing amounts represent the volume of photocatalyst in the final paint formulation (e.g., including solvent), rather than the volume percentage in the dried paint coating. Typically, the weight percent of titanium dioxide in the paint formulation will be between about 1% by weight and about 20% by weight, more typically between about 5 and about 10% by weight, and preferably about 7.5% by weight.

It is within the scope of the invention to provide paints having two or more different titanium dioxide photocatalysts, where at least one, and preferably each, of the titanium dioxide photocatalyst materials meet the specifications described above. Thus, for example, the invention embraces the use of bimodal photocatalytic titanium dioxide material, formed by combining two different titanium dioxide powders or sols, wherein at least one, and preferably both, have a particle size and/or surface area as defined above. In other embodiments, the photocatalyst will "consist essentially of" a particular titanium dioxide material described herein, by which is meant any additional photocatalyst having materially different activities is excluded, or that amounts of additional photocatalyst which materially impact the durability, de-polluting, or self-cleaning properties of the paint are excluded.

The paints of the invention comprise an organic binder. In the broadest aspect of the invention, it is contemplated that any polymeric binder may be employed. In one embodiment, the polymeric binder is a water-dispersible polymer, including but not limited to latex binders, such as natural latex, neoprene latex, nitrile latex, acrylic latex, vinyl acrylic latex, styrene acrylic latex, styrene butadiene latex, and the like. Exemplary polymers for these compositions include, but are not limited to, methyl methacrylate, styrene, methacrylic acid 2-hydroxyethyl acrylate polymer (CAS #70677-00-8), acrylic acid, methyl methacrylate, styrene, hydroxyethyl acrylate, butyl acrylate polymer (CAS #7732-38-6), butyl acrylate, methyl methacrylate, hydroxyethyl acrylate polymer (CAS #25951-38-6), butyl acrylate, 2-ethylhexyl acrylate, methyl methacrylate, acrylic acid polymer (CAS #42398-14-1), styrene, butylacrylate polymer (CAS #25767-47-9), butyl acrylate, 2-ethylhexyl acrylate, methacrylic acid polymer C (CAS #31071-53-1), acrylic polymers, and carboxylated styrene butadiene polymers to name a few. Combinations of more than one organic binder are also contemplated to be useful in the practice of the invention.

In particular, the organic binder may be chosen among copolymers of styrene/butadiene, and polymers and copolymers of esters of acrylic acid and in particular copolymers of polyvinylacrylic and styrene/acrylic esters. In the present invention, styrene acrylic copolymer includes copolymers of styrene/acrylic esters thereof. The styrene acrylic emulsion sold under the tradename ACRONAL™ 290D (BASF) has been found to be particularly useful as an organic binder in the inventive paints.

In some embodiments, the organic binder in the inventive paints will "consist essentially of" the preferred styrene acrylic binder, by which is meant that the presence of additional organic binders in amounts which materially reduce the durability of the paint coating on a substrate, as compared to an otherwise identical paint coating comprising only styrene acrylic binder as the organic binder, are excluded.

In some embodiments, the inventive paints will be substantially free of inorganic binders, by which is meant that the levels of inorganic binder is not sufficient to form a continuous adherent film on a substrate, in the absence of organic binder. In representative embodiments, the paints comprise less than 0.5% by weight, preferably less than about 0.2% by weight, and more preferred still, less than about 0.1% by weight inorganic binders. In some embodiments, the inventive paints are free of inorganic binders. Inorganic binders include, without limitation, alkali metal silicates such as, for example, potassium silicate, sodium silicate, and/or lithium silicate.

The paints according to the invention may further comprise one or more pigments. The term "pigments" is intended to embrace, without limitation, pigmentary compounds employed as colorants, including white pigments, as well as ingredients commonly known in the art as "opacifying agent" and "fillers." Included are any particulate organic or inorganic compound able to provide hiding power to the coating, and in particular at least one inorganic compound like non-photocatalytic titanium dioxide. Such titanium dioxide pigments which are not photoactive are disclosed in U.S. Pat. No. 6,342,099 (Millennium Inorganic Chemicals Inc.), the disclosure of which is hereby incorporated by reference. In particular, the titanium dioxide pigment may be the particles of Tiona™ 595 sold by Millennium Inorganic Chemicals Ltd. Pigments also include calcium carbonate, which is typically added to paint as a filler. One suitable calcium carbonate material is that sold under the tradename Setacarb™ 850 OC (Omya).

The paints according to the invention typically, but not necessarily, have a pigment volume concentration (PVC) between about 60% and about 90%, more typically between about 65% and about 80%, and preferably between about 70% and about 75%. The term "pigment volume concentration" refers to the total percentage by volume of all pigments in the composition, wherein the term "pigment" includes all forms of titanium dioxide, whether photocatalytic (e.g., PC500) or non-photocatalytic (e.g., Tiona™ 595), as well as any other components generally regarded in the art as pigments, including without limitation calcium carbonate and other particulate fillers.

If necessary, various other compounds may be added to the composition of the invention, but preferably such an addition does not compromise the shelf life, photoactivity, durability or non-staining properties of the resulting coating. Examples of such additional compounds include filler(s) such as quartz, calcite, clay, talc, barite and/or Na—Al-silicate, and the like; pigments like $TiO_2$, lithopone, and other inorganic pigments; dispersants such as polyphosphates, polyacrylates, phosphonates, naphthene and lignin sulfonates, to name a few; wetting agents, including anionic, cationic, amphoteric and/or nonionic surfactants; defoamers such as, for example, silicon emulsions, hydrocarbons, and long-chain alcohols; stabilizers, including for example, mostly cationic compounds; coalescing agents including, without limitation, alkali-stable esters, glycols, and hydrocarbons; rheological additives like cellulose derivatives (e.g., carboxymethylcellulose and/or hydroxyethylcellulose), xanthane gum, polyurethane, polyacrylate, modified starch, bentone and other lamellar silicates; water repellents such as alkyl siliconates, siloxanes, wax emulsions, fatty acid Li salts; and conventional fungicide or biocide.

Example 1

The ability of the inventive coatings to remove $NO_x$ pollutants, its self-cleaning properties, and its durability was investigated by preparing three water-based styrene acrylic paints. Comparative samples "Comp. 1" and "Comp. 2" each comprised 10% photocatalytic titanium dioxide by volume, whereas no photocatalyst was present in the control sample. The photocatalytic titanium dioxide used in Comp. 1 was PCS300 from Millennium Inorganic Chemicals. PCS300 is a photocatalytic titanium dioxide powder having an average crystallite size of about 5 to about 10 nm (nanometers). The photocatalytic titanium dioxide used in Comp. 2 was PC105, also from Millennium Inorganic Chemicals, which has an average crystallite size of about 15-25 nm. PCS300 and PC105 both have an anatase content of about 100%. The complete paint formulations are provided in Table 1.

TABLE 1

| Ingredient | Function | Comp. 1 | Comp. 2 | Control |
|---|---|---|---|---|
| | | | Weight (g) | |
| Part A | | | | |
| Water | solvent | 159.94 | 159.94 | 152.41 |
| Natrosol 250MR | thickener | 99.30 | 99.30 | 104.64 |
| Foammaster NXA | antifoaming agent | 0.60 | 0.60 | 0.63 |
| Antiprex A | dispersant | 3.30 | 3.30 | 3.48 |
| Tiona T595 | $TiO_2$ pigment | 70.58 | 70.58 | 74.37 |
| PC105 | $TiO_2$ photocatalyst | — | 47.06 | — |
| PCS300 | $TiO_2$ photocatalyst | 47.06 | — | — |
| Setacarb 850 OG | filler ($CaCO_3$) | 145.28 | 145.28 | 186.55 |
| Part B | | | | |
| Acronal 290D | styrene acrylic | 69.86 | 69.86 | 73.62 |
| Texanol | coalescent | 3.46 | 3.46 | 3.67 |
| Acticide SPX | bacteriocide | 0.60 | 0.60 | 0.63 |
| Total (weight) | | 600.00 | 600.00 | 600.00 |

The remaining components of Table 1 are as follows: The thickener is a 3% solution of hydroxyethylcellulose sold under the designation Natrosol™ 250 MR (Hercules). The antifoaming agent Foammaster™ NXA is proprietary, sold by Henkel Corp. Setacarb™ 850 OG is a calcium carbonate filler obtained from Omya. Antiprex™ A is water-soluble polymer dispersant from Ciba Specialty Chemicals. Tiona™ T595 is pigmentary titanium dioxide from Millennium Inorganic Chemicals. Acronal™ 290D is a styrene acrylic copolymer latex used as an organic binder available from BASF. Acronal™ 290D comprises 50% by weight solids in water. Texanol™ is an ester alcohol coalescing solvent sold by Eastman Kodak. Acticide SPX is a bacteriocide from Acti Chem Specialties Inc.

The Part A and Part B ingredients were separately mixed under high shear mixing. Part A was then added to Part B under high shear mixing to form the finished paints. Each paint sample is applied at a coverage of 770 g/m² (based on the dried weight of the coating) on a substrate and the substrates were submitted to the following tests.

I—Determination of $NO_x$ Removal by Coatings

The complete methodology for determining NOx removal is described in U.S. Patent Pub. 2007/0167551, the disclosure of which is hereby incorporated by reference. Briefly, the samples were placed in an air-tight sample chamber and sealed. The sample chamber is in communication with a three channel gas mixer (Brooks Instruments, Holland) through which NO (nitric oxide), $NO_2$ (nitrogen dioxide), and compressed air containing water vapor are introduced into the chamber at predetermined levels. The samples are irradiated with 8 W/m² UV radiation in the range of 300 to 400 nm from a UV Lamp Model VL-6LM 365 & 312 nanometer wavelengths (BDH). Initial values and final values (after five minutes irradiation) of NOx were measured by a Nitrogen Oxides Analyser Model ML9841B (Monitor Europe) connected to the sample chamber. The % reduction in NOx was measured as ($\Delta NOx$/Initial NOx)×100. Each sample was investigation without pre-activation and with pre-activation (after washing with water). The results are summarized in Table 2.

TABLE 2

| no pre-activation | | pre-activated | |
|---|---|---|---|
| Sample | % $NO_x$ Reduction | Sample | % $NO_x$ Reduction |
| Comp. 1 | 58.6 | Comp. 1 | 68.3 |
| Comp. 2 | 8.3 | Comp. 1 | 55.2 |
| Control | 0 | Control | 0 |

The results indicate that the paint comprising photocatalytic titanium dioxide powder having an average crystallite size of about 5 to about 10 nm (Comp. 1) exhibits a surprisingly high NOx activity even without the conventional washing step to pre-activate the photocatalyts. By comparison, Comp. 2 which comprises titanium dioxide powder having an average crystallite size of about 15 nm to about 25 nm exhibits a far lesser degree of NOx reduction in the absence of a pre-activation step. Comp. 1 and Comp. 2 both display excellent NOx removal properties after washing to pre-activate the catalyst. However, Comp. 1 with no pre-activation was unexpectedly superior to Comp. 2 even in the case where the Comp. 2 sample was pre-activated.

II—Determination of Coating Photoactivity Towards Methylene Blue

The methodology employed for determining photoactivity toward methylene blue is similar to that described in U.S. Patent Pub. 2007/0167551, the disclosure of which is hereby incorporated by reference, and is modified as described herein. The self-cleaning properties of each paint sample were investigated based on their ability to degrade the organic dye methylene blue. As the dye is degrades to water, carbon dioxide, and nitrogen containing species, a loss of color is observed. The photoactivity is monitored by measuring L* (brightness). The protocol is as follows:

Prepare a film of the paint on a suitable substrate such as Melinex film, aluminium panel, or glass plate. The film thickness should be similar to that used in the final application and generally not less than 25 microns thick when dry. The paint film is allowed to dry at least overnight.

Prepare a solution of methylene blue in water by dissolving 0.3739 g in one liter of water to give a concentration of 1 mmol/L. Pour the methylene blue solution into a suitable dish in which to immerse the paint film. Soak the paint films in the methylene blue solution for 30 to 60 minutes to ensure that the methylene blue is chemically absorbed onto the surface of the $TiO_2$.

Remove the paint film from the solution and remove excess with absorbent tissue. Thoroughly dry the paint films and then measure the brightness (L*) value using a colorimeter or spectrophotometer.

Expose the paint films to UV light for a period of between 18 to 48 hours at an intensity of 30 to 60 W/m² (300-400 nm wavelengths) such as in an Atlas Suntest cabinet.

Re-measure the L* value. The difference between the initial and final L* measurements is a measure of the self-cleaning power of the coating. The larger the difference in L* value the greater the self-cleaning effect. The results for each paint after 18 hours and 36 hours of irradiation are shown below in Table 3.

TABLE 3

| Sample | ΔL* | |
|---|---|---|
| | 18 hours | 36 hours |
| Comp. 1 | 15.3 | 18.2 |
| Comp. 2 | 10.6 | 12.5 |
| Control | 0 | 0 |

The results indicate that the paint comprising photocatalytic titanium dioxide powder having an average crystallite size of about 5 to about 10 nm (Comp. 1) exhibits substantially greater self-cleaning activity than the Comp. 2 sample after 18 hour and 36 hours of irradiation.

III—Determination of Coating Durability

The complete methodology for determining durability of the paints is described in U.S. Patent Pub. 2007/0167551, the disclosure of which is hereby incorporated by reference. The methodology involves accelerated weathering of 20 to 50 micron thick paint films on a stainless steel substrate in a Ci65A Weatherometer (Atlas Electric Devices, Chicago) under a 6.5 kW Xenon source emitting 550 W/m² UV at 340 nm. The samples were heated to about 63° C. and water spray was applied for 18 minutes out of every 120 minutes, with no dark cycle. The durability is measured as a function of the weight loss of the sample following exposure.

Table 4 summarizes the results for durability testing for Comp. 1 and Comp. 2 at various time intervals up to 1,551 hours.

TABLE 4

| hours | Comp. 1 | Comp. 2 |
|---|---|---|
| | Weight loss (%) | |
| 0 | 0.0 | 0.0 |
| 286 | 24.6 | 21.1 |
| 451 | 38.7 | 33.5 |
| 586 | 48.6 | 43.3 |
| 765 | 59.6 | 55.5 |
| 997 | 70.0 | 69.6 |
| 1,181 | 76.7 | 80.1 |
| 1,365 | 83.4 | 84.6 |
| 1,551 | 88.9 | 90.7 |

As shown in Table 4, the durability of the Comp. 2 paint is substantially identical to the durability of the less photoactive Comp. 1 paint after about 1,000 hours of exposure. This result was unexpected as it would have been anticipated that the more highly photoactive paint of Comp. 2 would have deteriorated substantially more rapidly than the less active Comp 1. under these conditions. It is noted that through 765 hours the % weight loss was marginally greater for the more active Comp. 1 paint with the maximum difference observed after about 451 hours. This is likely due to the fact that Comp. 1 has a much greater initial activity without pre-activation as compared to Comp. 2 (see Table 2). However, during weathering, both paints become fully activated, due to the presence of water, and the % weight loss is seen to converge at longer intervals. Over the entire period of accelerated weathering, Comp. 1 exhibited excellent durability which was comparable to Comp. 2.

III—Determination of NOx Removal Under Different Light Sources

The procedure for determination of $NO_x$ removal, described above in part I of this Example, was employed to determine the respective abilities of paint samples Comp. 1 and Comp. 2 to remove NOx under different light sources. In addition to UV, low intensity fluorescent strip lighting, day light (as filtered through glass), and Osram incandescent light sources were employed. In each case, the paints were tested without prior activation. The results are tabulated below (Table 5) and illustrated in FIG. 1.

TABLE 5

| Light Source | Comp. 1 | Comp. 2 |
|---|---|---|
| | % $NO_x$ Reduction | |
| UV | 61.6 | 14.1 |
| Fluorescent strip | 9.1 | 0.0 |
| Daylight | 22.4 | 1.0 |
| Incandescent | 7.8 | 0.0 |

The UV light was from a UV Lamp Model VL-6LM 365 & 312 nanometer wavelengths (BDH) as employed in part I of this Example. The fluorescent light was light produced from conventional indoor fluorescent strip lighting. The daylight was filtered through glass to provide an intensity of 2.4 microW/cm². The incandescent light was provided by an Osram incandescent lamp.

The results shown in Table 5 demonstrate that the Comp. 1 paint displays substantial NOx removal activity, without pre-activation, under each of the lighting sources, whereas the Comp. 2 paint, in the absence of pre-activation, has no activity under fluorescent strip or incandescent lighting and insubstantial activity in daylight (2.4 microW/cm²). The excellent performance of the Comp. 1 paint under these ultra-low UV lighting conditions is believed to arise due to the ability of the PCS300 photocatalyst to absorb in the visible spectrum. Without wishing to be bound by any particular theory, it is believed that the very small crystallite size (e.g., about 5-10 nm) results in a decrease in the band gap between the valence and conduction bands, thereby allowing the particles to create electron-hole pairs in the presence of visible light.

Example 2

While paints having photocatalyst crystallite sizes between about 5 and about 15 nm represent a preferred embodiment of the invention, including, for example, the paint designated Comp. 1 in Example 1 having a photocatalytic $TiO_2$ particle size of about 5-10 nm, the benefits of high PVC (pigment volume concentration) achievable through the use of a styrene acrylic binder are also seen, albeit more modestly, with less preferred titanium dioxide crystallite sizes (i.e., about 15 to about 50 nm). For example, paints employing high levels of PC105 photocatalyst (about 15 nm to about 25 nm crystallite size) will also find utility in coatings for removing $NO_x$.

This example illustrates the efficacy of the paint designated Comp. 2 in Example 1 in removing pollutants under "real world" conditions. A corner of a parking garage was sealed off by constructing two walls to provide a 917 m³ closed area with a ceiling height of 2.85 m. The 322 m² ceiling surface was coated with the Comp. 2 paint of Example 1 while the walls (existing and artificial) were covered with nylon. The photocatalytic paint was not pre-activated by washing with water. During the $NO_x$ removal experiments, the enclosure was illuminated by twenty UV lamps fixed symmetrically 20 cm from the ceiling to provide a total UV irradiance of 1 W/m².

The exhaust from a vehicle placed outside of the enclosure was connected by a pipe to the enclosed area such that exhaust gases were released 4.74 m inside the enclosure. Ventilation (inlet and outlet) was provided in the room through the artificial walls in order to maximize the concentration of pollutants near the ceiling and to provide an airflow and velocity of 566 m³/h and 14.3 m/h, respectively. The airflow and velocity of exhaust gas from the car were estimated to be 50.6 m³/h and 2 m/s, respectively, such that a positive pressure was maintained in the enclosed space in order to avoid the inflow of air from outside the enclosure.

The $NO_x$ exhaust gases from the car were continuously measured using a portable gas analyzer. NOx measurements were also taken continuously at the inlet and outlet ventilator and at a third sampling point near the ceiling about 15 in from the outlet ventilator.

After the exhaust gas was allowed to reach a steady state in the enclosure (approximately 3 hours), the UV lamps were turned on for four or five hours. The reduction in NO and $NO_2$ was measured as the difference between the steady state concentration and the final concentration after irradiation. The values were corrected for the decrease in NO concentration and the increase in $NO_2$ concentration in the car exhaust over the test period in order to isolate the contribution of the photocatalytic paint to the total reduction in these pollutants. The experiments were repeated over three consecutive days. On the fourth day, control measurements were taken in the absence of UV irradiation. The results are shown in Table 6 (% NO photocatalytic degradation) and Table 7 (% NO2 photocatalytic degradation).

TABLE 6

| Experimental Day | Initial NO concentration at steady state (ppb) | UV Irradiation time (h) | Final NO concentration (ppb) | Total % NO removed | % NO reduction in car emission | % NO degradation due to $TiO_2$ |
|---|---|---|---|---|---|---|
| 1 | 1092 | 5 | 581 | 46.8 | 28 | 18.8 |
| 2 | 623 | 5 | 351 | 43.6 | 28 | 15.6 |
| 3 | 1286 | 4 | 898 | 30.2 | 23.5 | 6.7 |
| 4 | 1151 | 0 | 829 | 28 (5 h) | 28 (5 h) | 0 |
|   |   |   | 880 | 23.5 (4 h) | 23.5 (4 h) |   |

TABLE 7

| Experimental Day | Initial $NO_2$ concentration at steady state (ppb) | UV Irradiation time (h) | Final $NO_2$ concentration (ppb) | Total % $NO_2$ removed | % NO increase in car emission | % NO degradation due to $TiO_2$ |
|---|---|---|---|---|---|---|
| 1 | 892 | 5 | 767 | 14 | 8.5 | 22.5 |
| 2 | 879 | 5 | 708 | 19.4 | 8.5 | 27.9 |
| 3 | 1110 | 4 | 1059 | 4.6 | 8.5 | 13.1 |
| 4 | 1031 | 0 | 1119 | 8.5 | 8.5 | 0 |

It is evident from the data in Tables 6 and 7 that a styrene acrylic paint comprising about 15-25 nm average size photocatalytic titanium dioxide crystallites at a level of 10% by volume (about 8% by weight) is effective in reducing $NO_x$ pollutants from the air, even in the absence of prior activation. Further, this example highlights the usefulness of the inventive paint coating in applications such a parking garage interiors where it is desirable to remove concentrated pollutants from the air.

Example 3

A styrene acrylic paint was prepared substantially as described in Example 1 except that PCS300 was replaced with a comparable 100% anatase photocatalytic titanium dioxide powder available from Millennium Inorganic Chemicals under the trade designation PC500. PC500 has a surface area of about 300 m²/g which translates to an average crystallite size of about 5 to about 10 nm. PC500 was included in the paint at a level of 8% by volume and the styrene acrylic binder comprised about 50% by volume. The ability of this paint to remove NOx without prior activation was studied as a function of UV intensity across a range of intensities from 0.5 W/m² to 8 W/m² according to the procedure described above in Example 1. The results are given in Table 8.

TABLE 8

| UV intensity (W/m²) | % $NO_x$ reduction |
|---|---|
| 0.5 | 31.3 |
| 1 | 37.1 |
| 2 | 40.6 |
| 3 | 44.2 |
| 4 | 45.5 |
| 5 | 46.4 |
| 6 | 46.9 |
| 7 | 46.9 |
| 8 | 47.3 |

These results demonstrate that even at very low UV intensities, the inventive paints provide high removal of pollutants, even without pre-activation. In fact, the difference in $NO_x$ reduction was only 16% (47.3%–31.3%) over more than one order of magnitude increase in UV intensity.

The PC500 paint was over-coated with various photocatalytic $TiO_2$ sols listed in Table 9 to investigate whether further improvements in the de-$NO_x$ properties could be attained.

TABLE 9

| Sample | Sol topcoat |
| --- | --- |
| A | none |
| B | S5300A |
| C | SP300N |
| D | S5300B (23.6% w/w $TiO_2$) |
| E | S5300B (10.0% w/w $TiO_2$) |
| F | S5300B (5.0% w/w $TiO_2$) |
| G | AW1610 (0.24% w/w $TiO_2$) |

Sample A represents styrene acrylic paint comprising PC500 photocatalyst without any sol topcoat. Samples B-G represent the paint of sample A having the indicated sol topcoat applied thereto. S5300A is a photocatalytic titanium dioxide sol available from Millennium Inorganic Chemicals. It is an aqueous colloidal dispersions of ultrafine $TiO_2$ (anatase) peptised with acid at a pH of about 1.1 (±0.4), having a titanium dioxide content of about 20 (±2) % by weight, a density of about 1.2 g/ml, and a surface area greater than 250 $m^2/g$ by 5-point BET (on dried product). S5300B, also available from Millennium Inorganic Chemicals, is also an aqueous colloidal dispersions of ultrafine $TiO_2$ (anatase) peptised with base at a pH of about 11.4 (±1), having a titanium dioxide content of about 17.5 (±2.5) % by weight, a density of about 1.1 g/ml, and a surface area greater than 250 $m^2/g$ by 5-point BET (on dried product). The various S5300B sols in Table 9 were modified to have the indicated titanium dioxide contents on a weight basis. AW1610 is a sol comprising photocatalytic $TiO_2$ having an average crystallite size of about 3.6 nm, pH of 9.2, a density of about 1.00 g/ml, and a $TiO_2$ content of about 0.25%. SP300N is a slurry of photocatalytic $TiO_2$ (about 17% by weight) having an average crystallite size of about 5-10 nm, pH of 7.0, and a density of about 1.15 g/ml.

Figure 2:
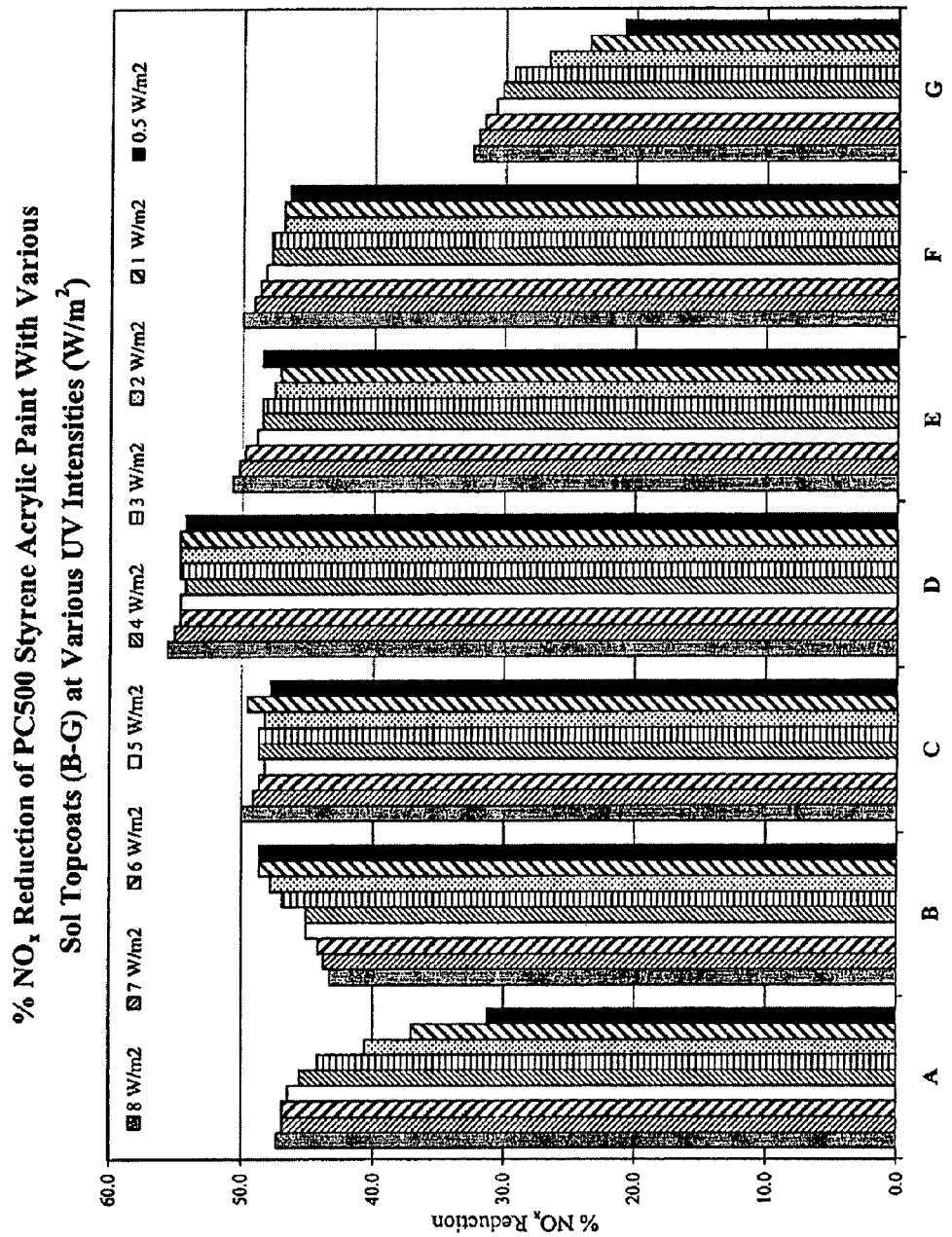
FIG. 2 compares the $NO_x$ activities of various coating systems comprising a styrene acrylic photocatalytic paint according to the invention having various photocatalytic titanium dioxide sol topcoats (B-G) disposed thereon.

The ability of each coating system (paint+sol) to remove $NO_x$ was investigated as a function of UV light intensity from 0.5 $W/m^2$ to 8 $W/m^2$. The results are shown in FIG. 2. As can be seen, coating system D comprising the PC500 paint with an overcoat of S5300B (23.6% w/w $TiO_2$) showed unexpectedly superior de-$NO_x$ across the entire range of UV intensities with only minimal variation in % $NO_x$ reduction across the range.

All references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A method of removing $NO_x$ compounds from the air comprising applying to a surface a layer of de-polluting coating comprising photocatalytic titanium dioxide, one or more additional pigments, and an organic latex binder comprising a styrene acrylic copolymer, said photocatalytic titanium dioxide being characterized by an average crystallite size between about 5 nm and about 10 nm, a surface area greater than 250 $m^2/g$, and having photocatalytic activity in the presence of visible light, said coating being capable of substantially removing $NO_x$ compounds from the air in the presence of visible light, without a step of first washing the coating with water to activate it.

2. The method of claim 1 wherein said coating is substantially free of inorganic binder.

3. The method of claim 1 wherein said coating is free of inorganic binder.

* * * * *